United States Patent [19]

Taguchi

[11] Patent Number: 5,257,293
[45] Date of Patent: Oct. 26, 1993

[54] PHASE LOCKED LOOP FOR EXTRACTING CLOCK PULSES THROUGH WAVE DIFFERENTIAL METHOD

[75] Inventor: Masayuki Taguchi, Tokyo, Japan
[73] Assignee: NEC Corporation, Tokyo, Japan
[21] Appl. No.: 893,446
[22] Filed: Jun. 4, 1992

[30] Foreign Application Priority Data

Jun. 13, 1991 [JP] Japan .................................. 3-140558

[51] Int. Cl.⁵ ............................................ H03D 3/24
[52] U.S. Cl. ........................................ 375/119; 331/17
[58] Field of Search ................... 375/119, 120, 80, 81;
331/1 A, 17, 18, 25

[56] References Cited

U.S. PATENT DOCUMENTS

| | | | |
|---|---|---|---|
| 4,984,249 | 1/1991 | Long et al. ........................... | 375/119 |
| 5,036,294 | 7/1991 | McCaslin ............................. | 375/120 |
| 5,058,142 | 10/1991 | Otsuka ................................. | 375/119 |
| 5,079,519 | 1/1992 | Ashby et al. ........................ | 331/1 A |

OTHER PUBLICATIONS

"A low jitter PLL for 2B+D Echo Canceller", Kokumai, Motohiro et al., Proceedings of 1986 Spring Conference of Communication Department of Electronic Communication Society, pp. 2-18.

Primary Examiner—Stephen Chin

[57] ABSTRACT

A phase locked loop extracts a clock signal through a wave differential method, and comprises a phase detector supplied with a sampled signal indicative of a variable discrete level of an input signal for producing a first output signal indicative of a waveform difference calculated from variable discrete levels of the sampled signal and a second output signal indicative of an integral calculated from waveform differences; a detector operative to produce a detecting signal indicative of continuation of the waveform differences less than a reference value; a calculator operative to calculate a virtual integral from integrals for producing a third output signal indicative of the virtual integral, the virtual integral and integrals previously calculated forming a convergent series; a selector operative to transfer the second output signal in the absence of the detecting signal and the third output signal in the presence of the detecting signal; and a series combination of a loop filter, a voltage controlled oscillator and a frequency divider responsive to the second and third output signals for producing the clock signal, thereby decreasing time period for convergence of phase difference.

6 Claims, 10 Drawing Sheets

PHASE LOCKED LOOP FOR EXTRACTING CLOCK PULSES THROUGH WAVE DIFFERENTIAL METHOD

FIELD OF THE INVENTION

This invention relates to a phase locked loop and, more particularly, to a phase locked loop for extracting clock pulses by the wave difference method.

DESCRIPTION OF THE RELATED ART

Figure 1:
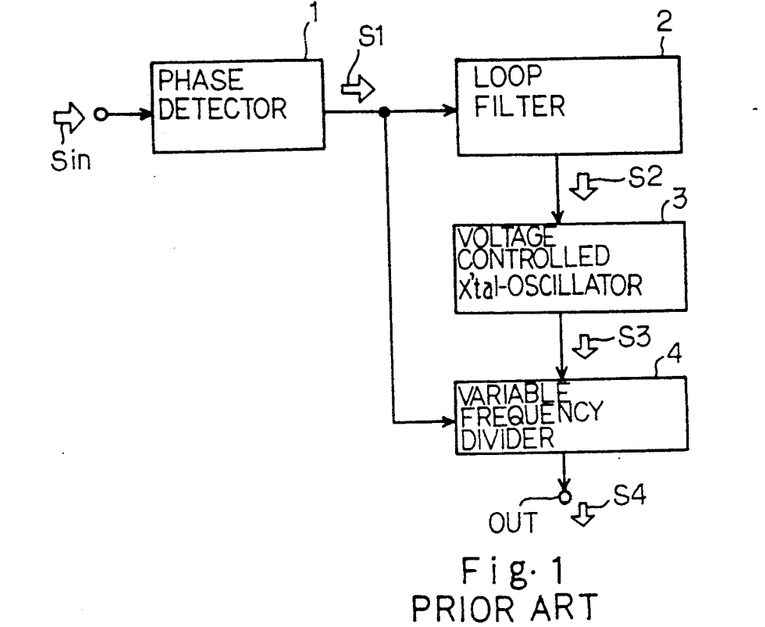
FIG. 1 is a block diagram showing the basic concept of the prior art phase locked loop.

A typical example of the phase locked loop used in the digital transmission system is disclosed by Kokumai et. al. in "A low-jitter PLL for 2B+D Echo Canceler", Proceedings of 1986 Spring Conference of Communication Department of Electronic Communication Society, page 2-18. FIG. 1 shows the basic concept of the phase locked loop disclosed by Kokumai et. al., and comprises a phase detector 1 coupled with an input terminal IN, a loop filter 2, a voltage controlled X'tal-Oscillator 3 and a variable frequency divider 4 coupled with an output terminal OUT. An input signal Sin is supplied to the input terminal IN, and is sampled at a predetermined sampling frequency twice as large as that of an extracted clock signal described hereinbelow. The phase detector 1 produces an output signal S1 through the wave differential method, and the output signal S1 is supplied in parallel to the loop filter 2 and the variable frequency divider 4. The loop filter 2 eliminates noises from the output signal S2, and the output signal S2 of the loop filter 2 is supplied to the voltage controlled X'tal-oscillator 3. Since pattern jitter due to the inter-symbol interference takes place in the output signal S1, a perfect integration type loop filter is desirable rather than a lag-lead type. The voltage controlled X'tal-oscillator 3 oscillates at an extremely high frequency tens times higher than the transmission clock rate under the control of the loop filter 2, and the output signal S3 of the voltage controlled X'tal-oscillator 3 is divided by the variable frequency divider 4 for producing the extracted clock signal S4. In the initial training, the dividing ratio is controlled by the phase detector 1.

Figure 2:
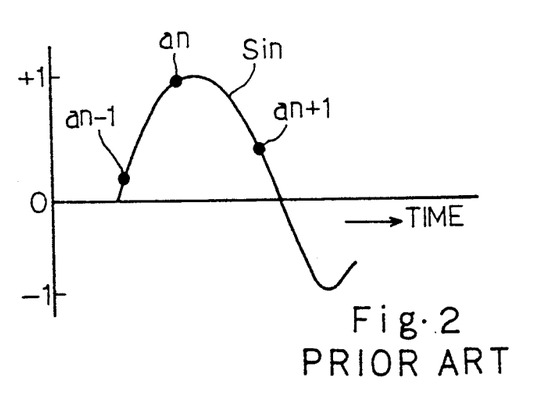
FIG. 2 is a graph showing the waveform of an input signal and sampled signals sampled therefrom.
Figure 3A:
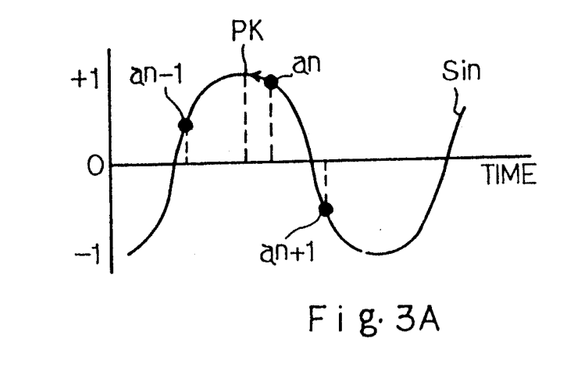
FIGS. 3A to 3D are graphs showing various relative relations between the sampled signals and the peak point of the input signal.
Figure 3B:
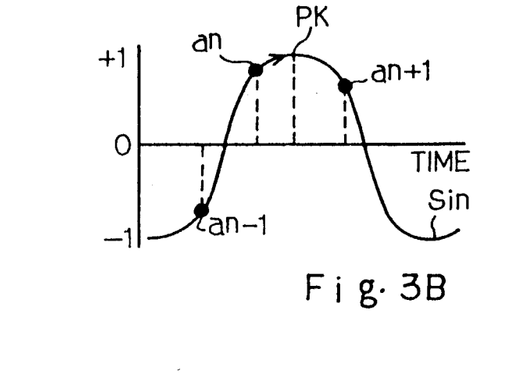
Figure 3C:
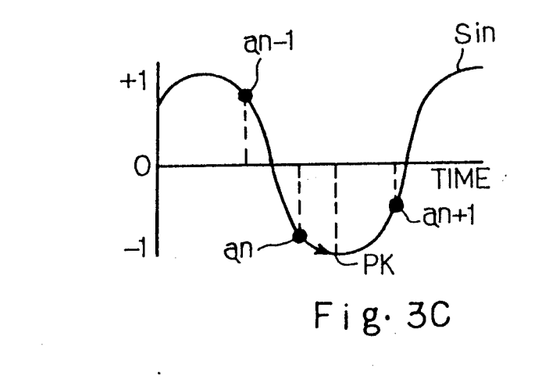
Figure 3D:
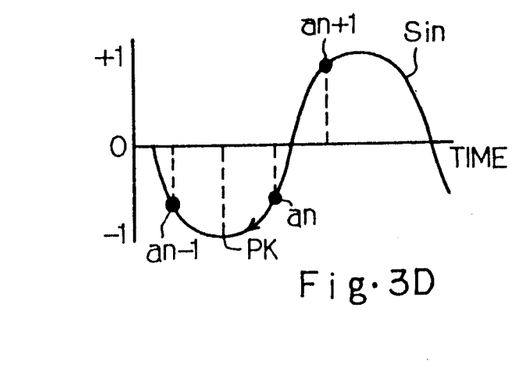

The wave differential method is hereinbelow briefly described with reference to FIGS. 2 and 3A to 3D. FIG. 2 shows the waveform of the input signal Sin, and the sampled signals are labeled with $a_{n-1}$, $a_n$, $a_{n+1}$, ... According to the wave differential method, the waveform difference $A_n$ is represented by Equation 1

$$A_n = a_n \times (a_{n-1} - a_{n+1}) \quad \text{Equation 1}$$

If the sampled signal $a_n$ is at the peak point of the input signal Sin, the sampled signals $a_{n-1}$ and $a_{n+1}$ are indicative of respective values equal to each other, and Equation 1 gives zero to the waveform difference $A_n$. The wave differential method contemplates the relation between the location of the sampled signal $a_n$ and the waveform difference $A_n$, and the oscillation frequency of the voltage controlled X'tal-oscillator 3 is controlled in such a manner as to bring the waveform difference $A_n$ to zero. With the oscillation frequency thus controlled, the variable frequency divider 4 produces the extracted clock signal S4 at the output terminal OUT. If the waveform difference $A_n$ is directly used as the output signal S1, the loop is less stable, and the waveform differences are integrated as $$S_n = A_n + (\tfrac{1}{2}) A_{n-1} \quad \text{Equation 2}$$

where $S_n$ is an integral of the waveform difference $A_n$. If the integral $S_n$ is greater than zero, the voltage controlled X'tal oscillator 3 is controlled to increase the frequency of the output signal S3. However, if the integral $S_n$ is less than zero, the voltage controlled X'tal oscillator 3 is controlled to decrease the frequency. FIGS. 3A to 3D shows various relative relations between the sampled signals $a_{n-1}$, $a_n$ and $a_{n+1}$ and the peak point PK of the input signal Sin; and each arrow is indicative of the direction of frequency shift. If the arrow is oriented to the left, the voltage controlled X'tal oscillator 3 increases the frequency. However, the arrow oriented to the right requests the voltage controlled X'tal oscillator 3 to decrease the frequency. Table 1 summarizes the behavior of the voltage controlled X'tal oscillator 3.

TABLE 1

| FIG. | $a_{n-1}$ | $a_n$ | $a_{n+1}$ | $A_n$ | Frequency of VCXO |
|------|-----------|-------|-----------|-------|-------------------|
| 3A | + | + | − | + | increase |
| 3B | − | + | + | − | decrease |
| 3C | + | − | − | − | decrease |
| 3D | − | − | + | + | increase |

In Table 1, the plus sign and the minus sign are indicative of the positive value and the negative value of the sampled signal.

As will be understood from the foregoing description, the waveform differential method is available in so far as the input signal Sin has the peak point PK such as a bipolar waveform. If data bit of "1" is carried by the bipolar waveform, the waveform differential method can effectively extract the clocks from the input signal. However, if the transmitted data bit is "0", the waveform difference $A_n$ tends to be zero at high probability. For this reason, in case where the extracted clock signal is synchronous with the input signal Sin carrying a string of transmitted data bits of "0", the voltage controlled X'tal oscillator 3 is liable to be uncontrollable, and asynchronism tends to take place. If, especially, the free-running frequency shift of the voltage controlled X'tal oscillator 3 is large or the clock rate on the transmitting side contains deviation, the voltage controlled X'tal oscillator 3 is much liable to be uncontrollable.

Figure 4:
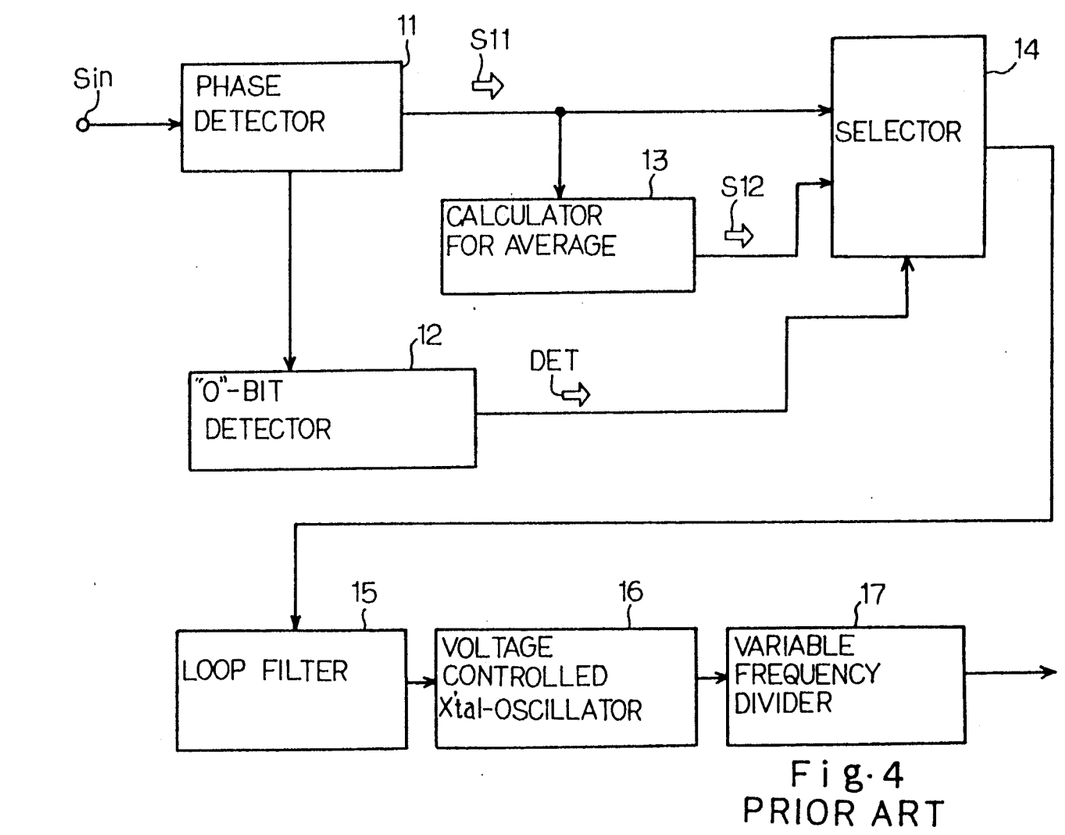
FIG. 4 is a block diagram showing the circuit arrangement of the phase locked loop which has been already proposed by the present inventor.

In order to overcome such an instability, the present inventor has proposed a phase locked loop shown in FIG. 4. In the phase locked loop proposed by the present inventor, and input signal Sin is supplied to a phase detector 11, and the phase detector 11 is coupled with a zero-bit detector 12 as well as with a calculator for average 13. The zero-bit detector 12 discriminates a string of bits of "0", and produces a detecting signal DET indicative of the string of bits "0". On the other hand, the calculator 13 averages values indicated by the output signal S11 sequentially supplied from the phase detector 11, and maintains the average value therein. A selector 14 is directly coupled with the phase detector 11 and with the calculator 13, and is responsive to the detecting signal DET indicative of the string of bits "0". Namely, the selector 14 supplies the output signal S11 to a loop filter in the absence of the detecting signal DET, and transfers the output signal S12 of the calculator 13 to the loop filter 15 in the presence of the detecting signal DET. The loop filter 15 is coupled with a voltage controlled X'tal oscillator 16 which in turn is coupled with a variable frequency divider 17 as similar to the prior art phase locked loop shown in FIG. 1.

Figure 5:
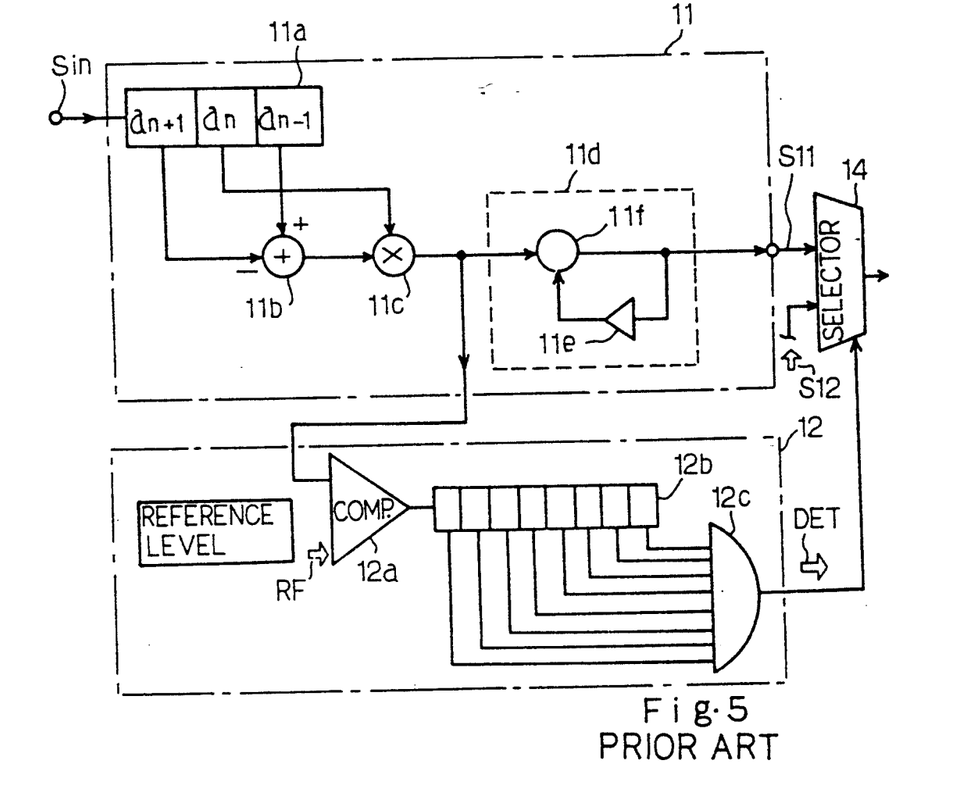
FIG. 5 is a circuit diagram showing the circuit arrangements of a phase detector and a zero-bit detector both incorporated in the phase locked loop shown in FIG. 4.
Figure 6:
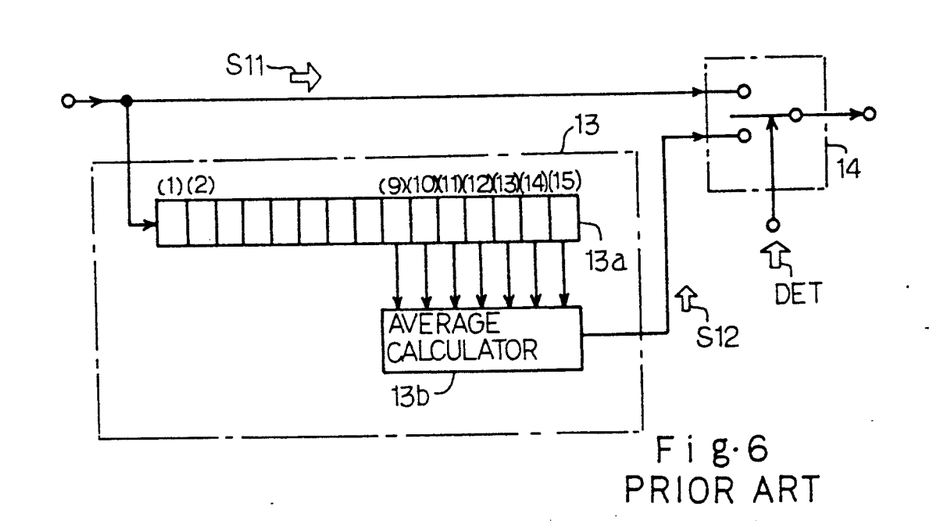
FIG. 6 is a circuit diagram showing the circuit arrangement of a calculator incorporated in the phase locked loop shown in FIG. 4.

FIG. 5 shows the circuit arrangement of the phase detector 11, and the phase detector 11 is equipped with a shift register 11 for storing sampled signals $a_{n-1}$, $a_n$ and $a_{n+1}$, and the sampled signals $a_{n-1}$ and $a_{n+1}$ are supplied to an adder 11b for producing the sum of the values. The sum is further supplied to a multiplier 11c, and the multiplier 11c multiplies the sum by the value of the sampled signal $A_n$. Thus, the adder 11b and the multiplier 11c calculates the waveform difference $A_n$ in accordance with Equation 1, and the waveform difference $A_n$ is supplied to an integrator 11d implemented by a loop consisting of a multiplier 11e and an adder 11f for calculating an integral $S_n$ in accordance with Equation 2. Namely, the value of the waveform difference $A_{n-1}$ previously supplied is multiplied by ½, and the product $A_{n-1}/2$ is added to the waveform difference $A_n$. Then, the integral $S_n$ is calculated, and is represented by the output signal S11. On the other hand, the zero-bit detector 12 has a comparator 12a, and the waveform difference $A_n$ and a reference level RF are supplied to the comparator 12a. The comparator 12a compares the waveform difference $A_n$ with the reference level RF, and produces an output bit of "1" if the waveform difference $A_n$ is less than the reference level RF. The output bit of the comparator 12a is sequentially supplied to an eight-stage shift register 12b, and the output bits respectively stored in the eight stages are supplied in parallel to an AND gate 12c. If all of the output bits are "1", the previous eight waveform differences form a string of zero bits, and the AND gate 12c detects the string so as to produce the detecting signal DET. FIG. 6 shows the circuit arrangement of the calculator 13, and the calculator 13 comprises a 15 stage shift register 13a for storing values of the integral $S_n$ sequentially supplied from the phase detector 11, and the ninth to fifteenth stages of the shift register 13a are coupled in parallel to an average calculator 13b. The average calculator 13b calculates the average of the values stored in the ninth to fifteenth stages, and the average is indicated by the output signal S12. Even if the string of bits "0" takes place, the first to eighth stages store the corresponding integrals. However, at least one of the ninth to fifteenth stages stores value except for zero, and, accordingly, the average is not zero. Since the detecting signal DET causes the selector 14 to transfer the output signal S12 indicative of the average to the loop filter 15, the voltage controlled X'tal oscillator 15 continues to vary the frequency in the same direction as the previous controlling status, and undesirable asynchronism hardly takes place.

Figure 7A:
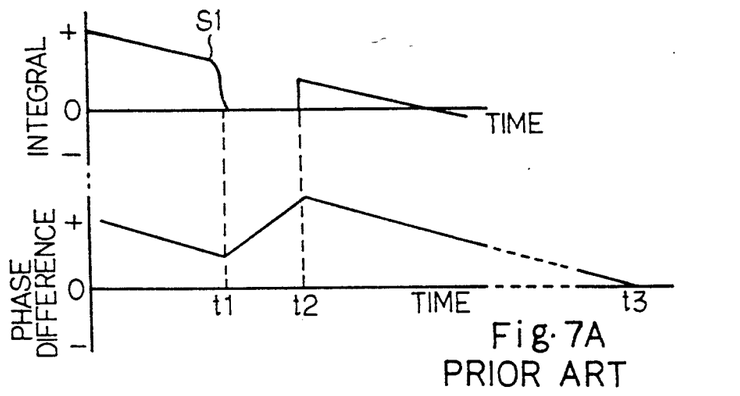
FIGS. 7A to 7C are graphs illustrating time intervals for convergence.
Figure 7B:
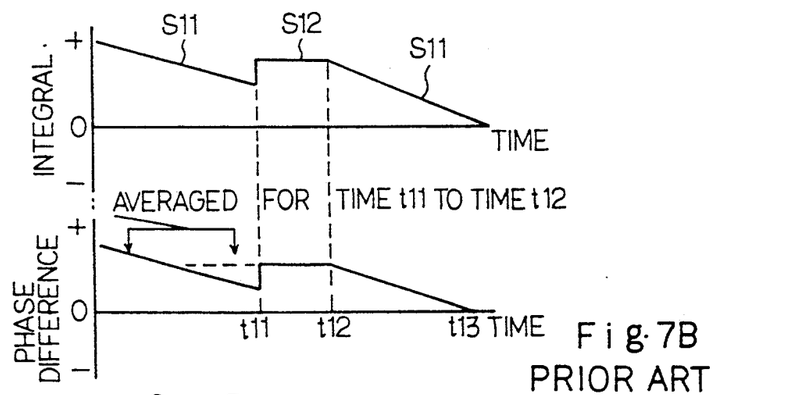

Thus, the phase locked loop proposed by the present inventor is effective against a string of zero bits by virtue of the zero-bit detector 12, and enhances the stability. FIGS. 7A and 7B illustrate functions of the prior art phase locked loops respectively shown in FIGS. 1 and 4. If a phase locked loop is not equipped with any zero-bit detector as shown in FIG. 1, a string of zero bits causes the output signal S1 to be indicative of zero from time t1 to time t2 of FIG. 7A, and the phase difference is increased due to uncontrollable voltage controlled X'tal oscillator 3 over the time period between time t1 and time t2. As a result, the phase difference converges at zero at time t3. However, if a phase locked loop is equipped with the zero-bit detector 12 as shown in FIG. 4, the selector 14 transfers the output signal S12 to the loop filter 15 from time t11 to time 12 of FIG. 7B instead of the output signal S11 indicative of zero, and the phase difference is kept flat over the time period from time t11 to time t12. The phase difference converges at time t13, and the time interval between time t12 and time t13 is shorter than the time interval between time t2 and time t3. The zero-bit detector 12 effectively shrinks the time interval for convergence. However, the phase difference is hardly decreased during the time interval between time t11 and time t12, and the convergence in the presence of a string of zero bits is still prolonged in comparison with a convergence in the absence of any string of zero bits. Asynchronism often takes place at transient phenomena upon power-on event as well as at turbulence, and is causative of reduction in transmission rate. On the other hand, there is an increasing request to enhance the transmission rate in, for example, ISDN system, and such a prolonged convergence deteriorates the service.

SUMMARY OF THE INVENTION

It is therefore an important object of the present invention to provide a phase locked loop which accelerates the convergence of phase difference.

To accomplish the object, the present invention proposes to vary a voltage value supplied through a loop filter to a voltage controlled oscillator in the presence of a string of zero bits.

In accordance with the present invention, there is provided a phase locked loop for extracting a clock signal from an input signal through a waveform differential method, comprising: a) a phase detector supplied with a sampled signal indicative of a variable discrete level of the input signal, and producing a first output signal indicative of a waveform difference calculated from a plurality of variable discrete levels of the sampled signal and a second output signal indicative of an integral calculated from waveform differences; b) a detector operative to monitor the first output signal to see whether or not the waveform difference is less than a reference value, and producing a detecting signal indicative of continuation of the waveform differences less than the reference value; c) a calculator operative to calculate a virtual integral from integrals sequentially indicated by the second output signal, and producing a third output signal indicative of the virtual integral, the virtual integral and integrals previously calculated forming in combination a convergent series; d) a selector operative to transfer the second output signal in the absence of the detecting signal and the third output signal in the presence of the detecting signal; and e) an extracting means responsive to the second and third output signals for producing a clock signal.

BRIEF DESCRIPTION OF THE DRAWINGS

The features and advantages of the phase locked loop according to the present invention will be more clearly understood from the following description taken in conjunction with the accompanying drawings in which.

DESCRIPTION OF THE PREFERRED EMBODIMENTS

First Embodiment

Figure 8:
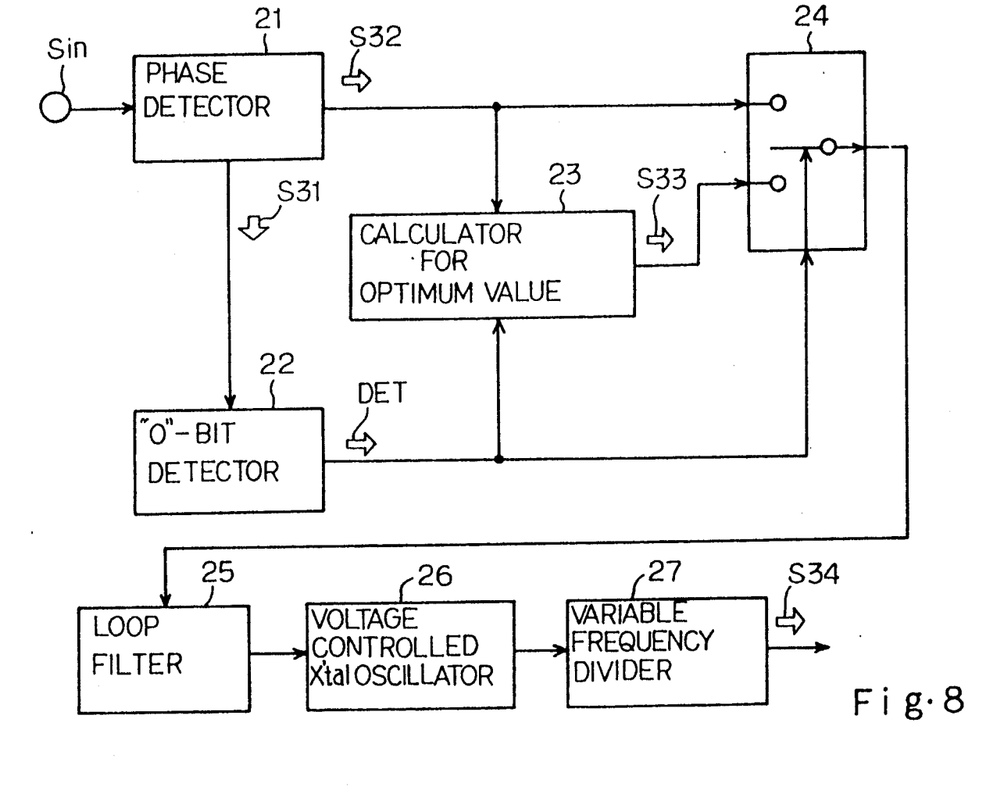
FIG. 8 is a block diagram showing the circuit arrangement of a phase locked loop according to the present invention.

Referring to FIG. 8 of the drawings, a phase locked loop embodying the present invention comprises a phase detector 21, a zero-bit detector 22, a calculator for optimum value 23, a selector 24, a loop filter 25, a voltage controlled X'tal oscillator 26, and a variable frequency divider 27. The phase detector 21 is similar in circuit arrangement to the phase detector 11, and produces a first output signal S31 indicative of a waveform difference $A_n$ and a second output signal S32 indicative of an integral $S_n$ or an averaged waveform difference. The zero-bit detector 22 is also similar in circuit arrangement to the zero-bit detector 12, and produces a detecting signal DET upon occurrence of a string of zero bits. The calculator 23 calculates an optimum value linearly varied in the presence of the string of zero bits, and produces a third output signal S33 indicative of the optimum value. The selector 24 is responsive to the detecting signal DET, and transfers either output signal S32 or S33 to the loop filter 25. The loop filter 25, the voltage controlled X'tal oscillator 26 and the variable frequency divider 27 are similar to those of the prior art, and an extracted clock signal S34 is produced at the output node of the variable frequency divider 27. However, no further description is made on the loop filter 25, the voltage controlled X'tal oscillator 26 and the variable frequency divider 27 for the sake of simplicity.

Figure 7C:
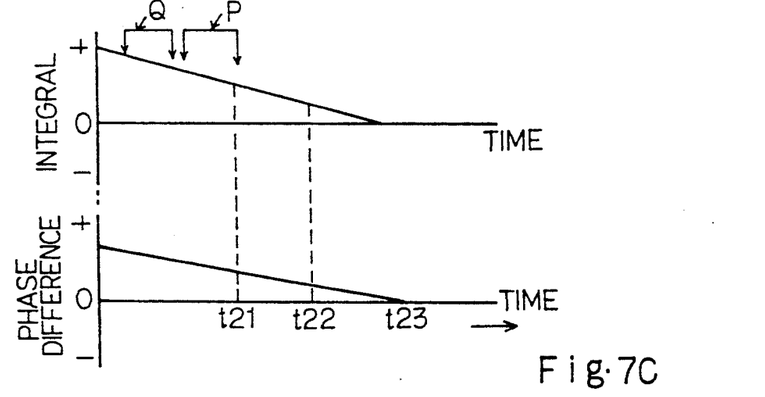
Figure 9:
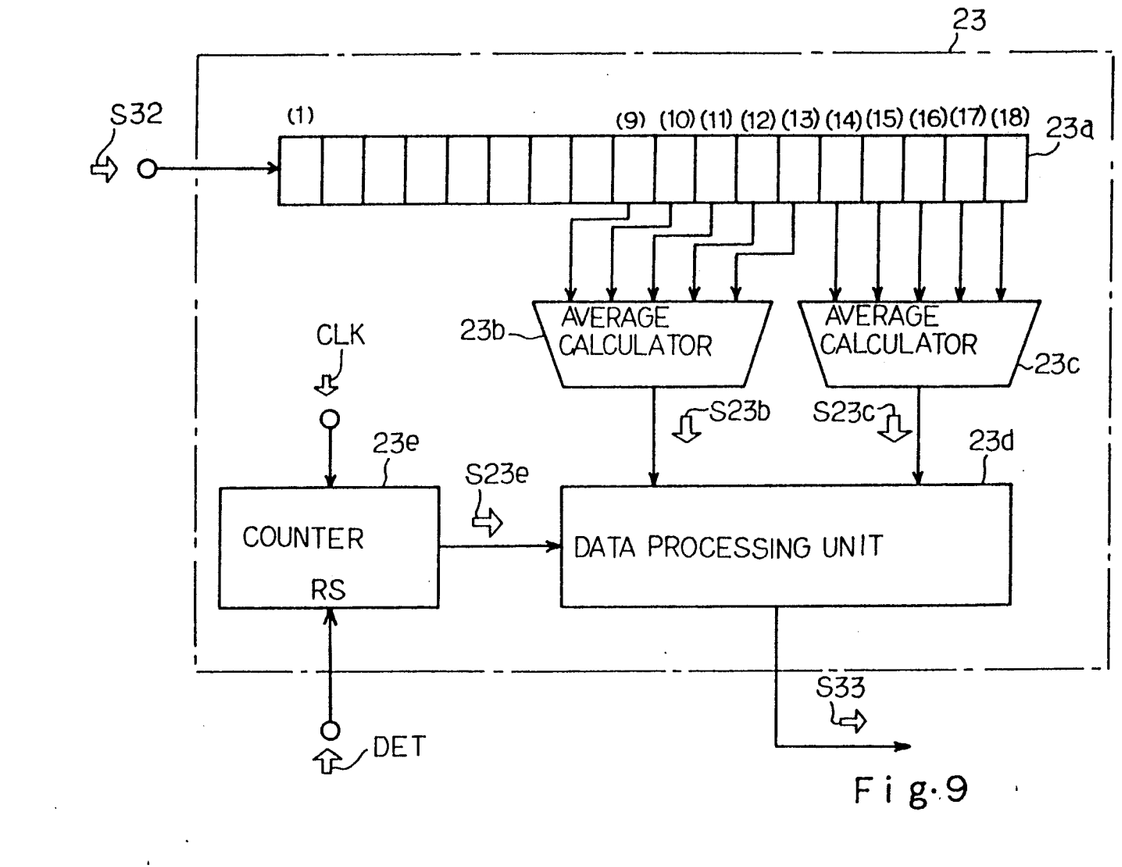
FIG. 9 is a block diagram showing the circuit arrangement of a calculator for optimum value incorporated in the phase locked loop shown in FIG. 8.

Turning to FIG. 9 of the drawings, the circuit arrangement of the calculator 23 is illustrated in detail. The calculator 23 comprises a shift register 23a supplied with the second output signal S32, and sequentially stores integrals represented by the output signal S32. In this instance, the first to eighth stages are lower stages, the ninth to thirteenth stages are intermediate stages, and the fourteenth to eighteenth stages are higher stages. An integral are sequentially shifted from the first stage to the eighteenth stage, and finally overflows from the eighteenth stage. The ninth to thirteenth stages are coupled in parallel with a first average calculator 23b, and the fourteenth to eighteenth stages are coupled in parallel with a second average calculator 23c. The first average calculator 23b averages the integrals stored in the ninth to thirteenth stages, and produces a first average signal S23b indicative of the first average calculated by the first average calculator 23b. Similarly, the second average calculator averages the integrals stored in the fourteenth to eighteenth stages, and produces a second average signal S23c indicative of the second average calculated by the second average calculator 23c. The calculator 23 further comprises a data processing unit 23d, and a counter 23e. The counter 23e is reset with the detecting signal DET, and increments the value stored therein in synchronism with a clock signal CLK. The counter 23e produces an output signal S23e indicative of the value sequentially incremented, and the value represented by the output signal S23e serves as a multiplier factor in the data processing unit 23d. The first average signal S23b indicative of the first average, the second average signal S23c indicative of the second average and the output signal S23e indicative of the multiplier factor are supplied to the data processing unit 23d, and the data processing unit 23d calculates a virtual integral or variable optimum value. The virtual integral $S_n'$ is given as $$S_n' = (Q - P) \times m/10 + P \qquad \text{Equation 1}$$

where P and Q are the first and second averages, m is the multiplier factor, and 10 is the number of the intermediate and higher stages, i.e., the ninth to eighteenth stages. Since the multiplier m is incremented in synchronism with the clock signal CLK, the virtual integral $S_n'$ is also incremented, and the third output signal S33 is increased in value with time. While the zero-bit detector 12 does not produce the detecting signal DET, the selector 24 transfers the second output signal S32 indicative of the integral $S_n$ to the loop filter 25. However, if the zero-bit detector 22 discriminates a string of zero bits, the detecting signal DET is supplied to the selector 24, and the third output signal S33 indicative of the virtual integral $S_n'$ is transferred to the loop filter 25. For this reason, after replacement with the third output signal S33, the virtual integral $S_n'$ is decremented over the time period of the string of zero bits, i.e., from time t21 to time t22 of FIG. 7C, and the phase difference converges at time t23. Since the phase difference is decreased over the time period, the time interval between time t22 and time t23 is shorter than the time period between time t12 and time t13.

Figure 10:
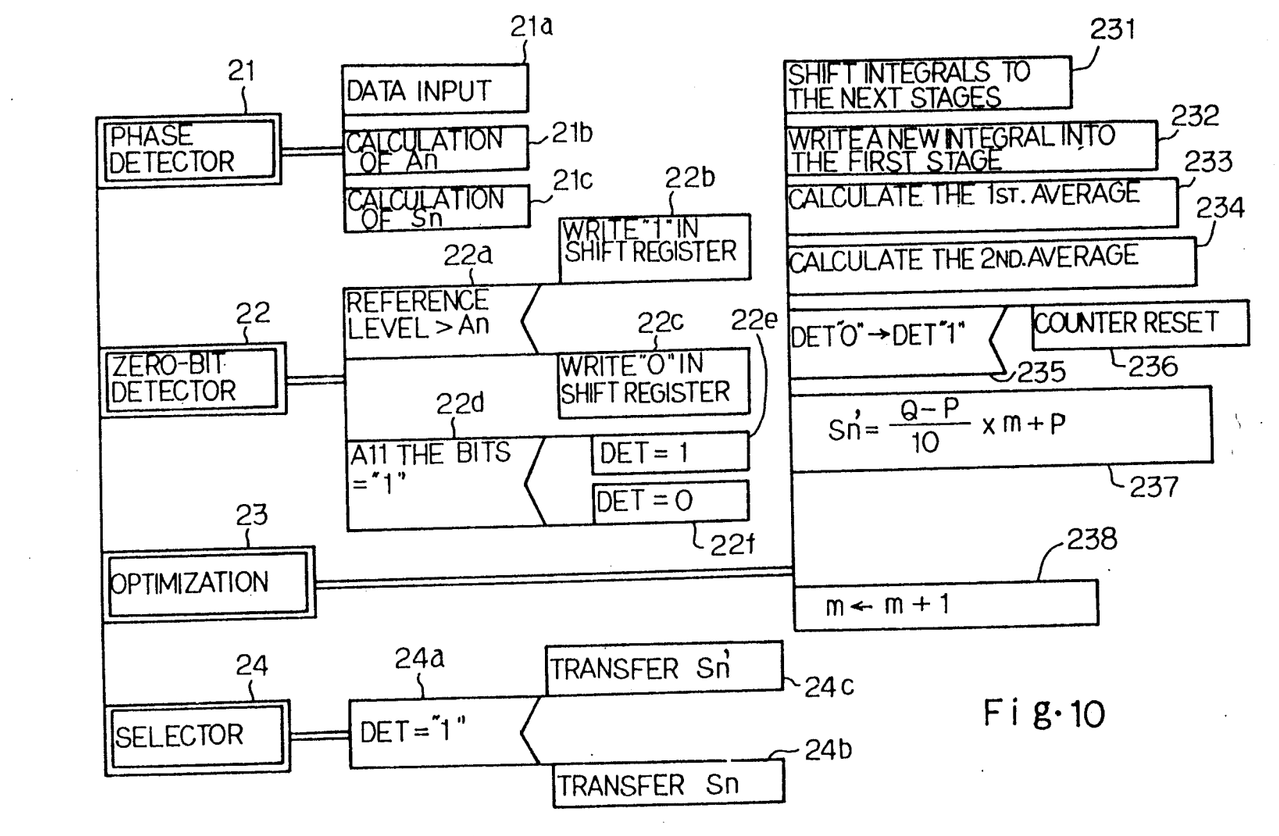
FIG. 10 is a chart showing the behavior of the phase locked loop shown in FIG. 8.

FIG. 10 shows job assignments of component units incorporated in the phase locked loop shown in FIG. 8 for extracting the clock signal S34. A data input 21a, the calculation of the waveform difference $A_n$ and the calculation of the integral $S_n$ are assigned to the phase detector 21. The zero-bit detector 22 compares the waveform difference $A_n$ with a reference level to see whether or not the reference level is greater than the waveform difference $A_n$ as by step 22a. If the answer is affirmative, bit "1" is written into a shift register corresponding to the shift register 12b, and the previous bit either "1" or "0" is shifted to the next stage as by step 22b. On the other hand, if the answer is negative, bit "0" is written into the shift register, and the previous bit is shifted to the next stage as by step 22c. The zero-bit detector 22 further checks the shift register corresponding to the shift register 12b to see whether or not all the eight bits are "1" as by step 22d. If the answer is affirmative, the zero-bit detector 22 produces the detecting signal DET of active "1" level as by step 22e. While the answer at step 22d remains negative, the zero-bit detector 22 does not produce the detecting signal DET or allows the detecting signal DET to remain in inactive "0" level as by step 22f.

The calculator 23 carries out the optimization as by step 23. One of the jobs assigned to the calculator 23 is to shift previously stored integrals to the next stages of the shift register 23a as by step 231, and another job is to write a newly supplied integral into the firs stage of the shift register 23a as by step 232. The calculation of the first average and the calculation of the second average are further carried out as by steps 233 and 234, and the calculator 23 monitors the detecting signal DET to see whether or not the detecting signal DET is changed from the inactive "0" to the active "1" as by step 235. If the answer is affirmative, the counter 23e is reset to zero as by step 236. The data processing unit 23d calculates the virtual integral $S_n'$ as by step 237, and repeats steps 231 to 237 together with incrementing the multiplier factor m as by step 238. The selector also monitors the detecting signal DET to see if or not the detecting signal DET is in the active "1" level as by step 24a. While the answer remains negative, the selector 24 transfers the integral $S_n$ to the loop filter 25. On the other hand, if the answer is given affirmative, the selector 24 transfers the virtual integral $S_n'$ to the loop filter 25 as by step 24c.

Thus, the selector 24 provides a variable virtual integral $S_n'$ in the presence of a string of zero bits to the loop filter 25, and the phase difference is gradually decreased over the time period of the string of zero bits. This results in that time period for the convergence is shrunk rather than that of the prior art shown in FIG. 4.

Second Embodiment

Figure 11:
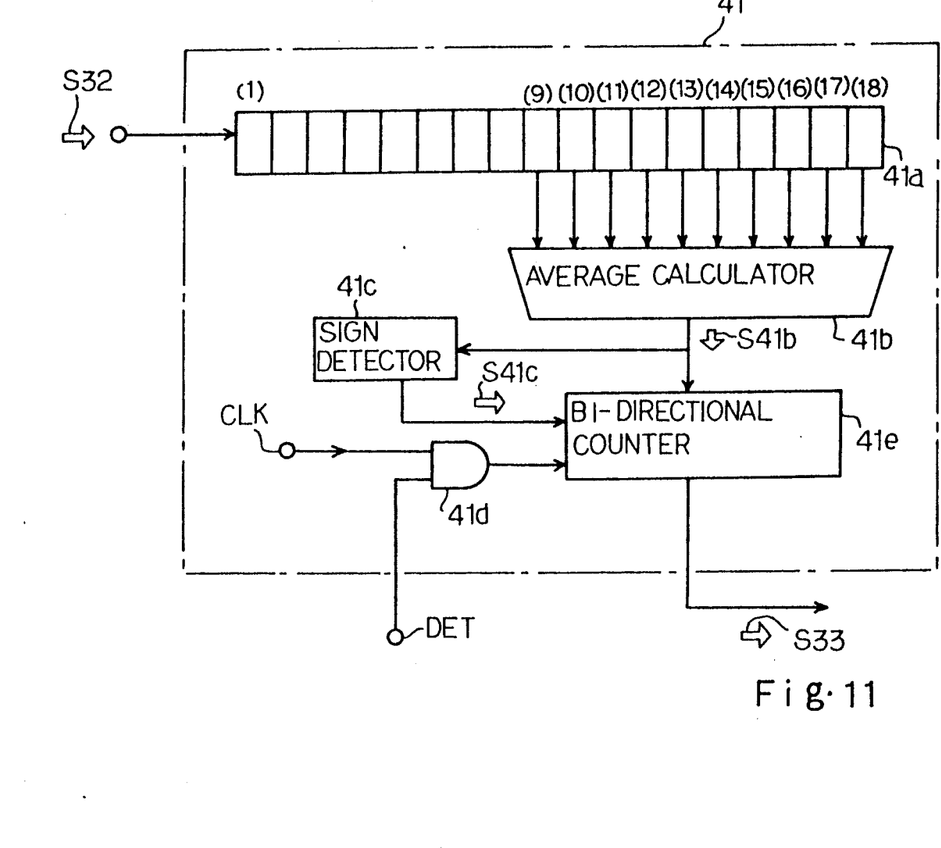
FIG. 11 is a block diagram showing the circuit arrangement of a calculator for optimum value incorporated in another phase locked loop according to the present invention.

Turning to FIG. 11 of the drawings, a calculator 41 for a variable optimum value is illustrated. Although the other circuit components are similar to those of the first embodiment, no further description is incorporated hereinbelow for the sake of simplicity. The calculator 41 comprises a eighteen stage shift register 41a for storing integrals, an average calculator 41b coupled in parallel with the ninth to eighteenth stages, a sign detector 41c associated with the average calculator 41b, an AND gate 41d enabled with the detecting signal DET for transferring a clock signal CLK, and a bi-directional counter 41e for producing the third output signal S33 indicative of a virtual integral.

Figure 12:
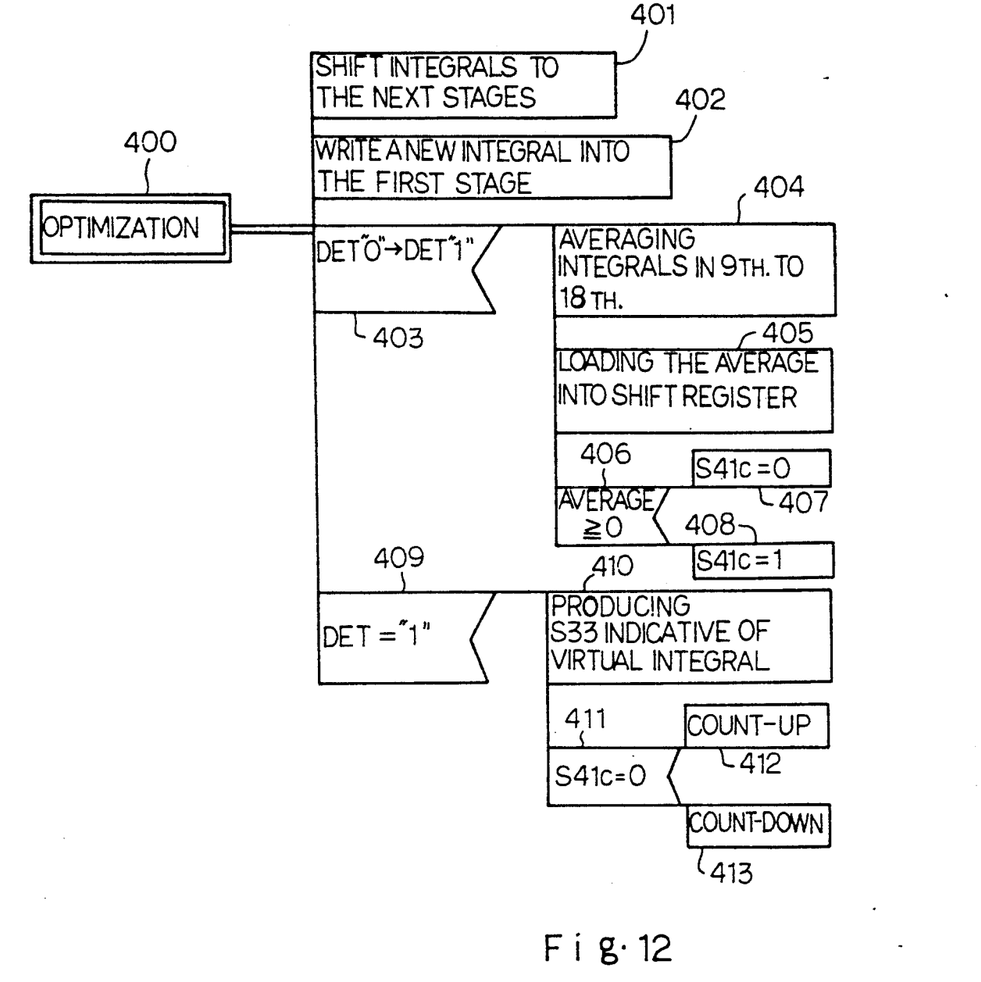
FIG. 12 is a chart showing the behavior of the calculator shown in FIG. 11.

The calculator 41 carries out optimization 400, and jobs are assigned to the components of the calculator 41 as shown in FIG. 12. Upon arrival of a new integral represented by the second output signal S32, the shift register 41a shifts the previously stored integrals to the next stages as by step 401, and the new integral is written into the first stage as by step 402. The calculator 41 monitors the detecting signal DET to see whether or not the detecting signal DET is changed from "0" level to "1" level as by step 403. If the answer is given affirmative, the average calculator 41b averages the integrals stored in the ninth to eighteenth stages as by step 404, and produces an average signal S41 indicative of the average. The average signal S41 is supplied in parallel to the sign detector 41c and the bi-directional counter 41e. The sign detector checks the average whether or not the positive sign is associated with the average as by step 406. If the answer is affirmative, the sign detector 41c produces an output signal S41c of "0" level as by step 407. However, if the answer is given negative, the sign detector 41c produces the output signal of "1" as by step 408. The AND gate 41d is enabled with the detecting signal DET, and, for this reason, monitors the detecting signal DET to see whether or not the detecting signal DET is in the active "1" level as by step 409. If the answer is affirmative, the bi-directional counter 41e produces the third output signal S33 indicative of a virtual integral from the average loaded from the average calculator 41b as by step 410. The bi-directional counter 41e decides whether or not the output signal S41c is zero as by step 411. If the answer is affirmative, the bi-directional counter 41e is switched to a count-up mode as by step 412, and varies the virtual integral in response to the clock signal CLK supplied through the AND gate 41d. On the other hand, if the answer is negative, the bi-directional counter 41e selects a count-down mode as by step 413, and varies the virtual integral.

Thus, the calculator 41 also varies the virtual integral, and a selector corresponding to the selector 24 transfers either second or third output signal to a loop filter depending upon the detecting signal. For this reason, time interval to convergence is shrunk as similar to the first embodiment.

Although particular embodiments of the present invention have been shown and described, it will be obvious to those skilled in the art that various changes and modifications may be made without departing from the spirit and scope of the present invention.

What is claimed is:

1. A phase locked loop for extracting a clock signal from an input signal through a waveform differential method, comprising:
    a) a phase detector supplied with a sampled signal indicative of a variable discrete level of said input signal, and producing a first output signal indicative of a waveform difference calculated from a plurality of variable discrete levels of said sampled signal and a second output signal indicative of an integral calculated from waveform differences;
    b) a detector operative to monitor said first output signal to see whether or not said waveform difference is less than a reference value, and producing a detecting signal indicative of continuation of said waveform differences less than said reference value;
    c) a calculator operative to calculate a virtual integral from integrals sequentially indicated by said second output signal, and producing a third output signal indicative of said virtual integral, said virtual integral and integrals previously calculated forming in combination a convergent series;
    d) a selector operative to transfer said second output signal in the absence of said detecting signal and said third output signal in the presence of said detecting signal; and
    e) an extracting means responsive to said second and third output signals for producing a clock signal.

2. A phase locked loop as set forth in claim 1, in which said calculator comprises c-1) a shift register having a plurality of stages including lower stages, intermediate stages and higher stages for sequentially storing integrals sequentially indicted by said second output signal, c-2) a first average calculator associated with said intermediate stages, and calculating a first average of the integrals stored in said intermediate stages, c-3) a second average calculator associated with said higher stages, and calculating a second average of the integrals stored in said higher stages, c-4) a counter reset with said detecting signal, and operative to output a signal indicative of a multiplier factor, and c-5) a data processing unit operative to produce said virtual integral from said first and second averages and said multiplier factor, said virtual integral being incremented together with said multiplier factor.

3. A phase locked loop as set forth in claim 2, in which said data processing unit calculates a difference between said second and first averages, then multiplying said difference by said multiplier factor, then dividing the product by the number of said intermediate and higher stages, then adding the quotient to said first average.

4. A phase locked loop as set forth in claim 1, in which said calculator comprises c-1) a shift register having a plurality of stages including lower stages, intermediate stages and higher stages for storing integrals sequentially indicated by said second output signal, c-2) an average calculator associated with said intermediate and higher stages for calculating an average of the integrals stored in said intermediate and higher stages, c-3) a discriminator operative to discriminate the sign of said average for producing an instruction signal indicative of either count-up or count-down, c-4) a logic gate responsive to said detecting signal for producing a clock signal, and c-5) a bi-directional counter operative to latch said average, and responsive to said instruction signal for varying said average in synchronism with said clock signal, thereby producing said virtual integral.

5. A phase locked loop as set forth in claim 1, in which said extracting means comprises e-1) a loop filter supplied with said second and third output signals, and operative to eliminate noises from said second and third output signals for producing a fourth output signal, e-2) a voltage controlled X'tal oscillator responsive to said fourth output signal for producing a fifth output signal, and e-3) a variable frequency divider responsive to said fifth output signal for producing said clock signal.

6. A phase locked loop for extracting a clock signal from an input signal through a waveform differential method, comprising:
   a) a phase detector supplied with a sampled signal indicative of a variable discrete level of said input signal, and producing a first output signal indicative of a waveform difference calculated from a plurality of variable discrete levels of said sampled signal and a second output signal indicative of an integral calculated from waveform differences;
   b) a detector operative to monitor said first output signal to see whether or not said waveform difference is less than a reference value, and producing a detecting signal indicative of continuation of said waveform differences less than said reference value;
   c) a calculator operative to calculate a virtual integral from integrals sequentially indicated by said second output signal, and producing a third output signal indicative of said virtual integral, said virtual integral and integrals previously calculated forming in combination a convergent series;
   d) a selector operative to transfer said second output signal in the absence of said detecting signal and said third output signal in the presence of said detecting signal;
   e) a loop filter supplied with said second and third output signals, and operative to eliminate noises from said second and third output signals for producing a fourth output signal;
   f) a voltage controlled X'tal oscillator responsive to said fourth output signal for producing a fifth output signal; and
   g) a variable frequency divider responsive to said fifth output signal for producing said clock signal.

* * * * *